(12) United States Patent
Hartenstine et al.

(10) Patent No.: US 7,374,196 B2
(45) Date of Patent: May 20, 2008

(54) STANDING FOLDABLE STROLLER

(76) Inventors: Curtis M. Hartenstine, 20 Osprey La., Birdsboro, PA (US) 19508; Robert E. Haut, 220 Westtown Way, West Chester, PA (US) 19382

( * ) Notice: Subject to any disclaimer, the term of this patent is extended or adjusted under 35 U.S.C. 154(b) by 472 days.

(21) Appl. No.: 11/040,247

(22) Filed: Jan. 21, 2005

(65) Prior Publication Data

US 2006/0163847 A1 Jul. 27, 2006

(51) Int. Cl.
*B62B 7/06* (2006.01)
(52) U.S. Cl. .................. 280/642; 280/47.38; 280/650; 280/644; 280/658; 280/647
(58) Field of Classification Search ................ 280/650, 280/642, 47.38, 47.33, 47.4, 644, 658, 647, 280/649, 33.99; 297/188.14, 188.2, 227; 248/311.2
See application file for complete search history.

(56) References Cited

U.S. PATENT DOCUMENTS

| | | | |
|---|---|---|---|
| 4,817,982 A * | 4/1989 | Kassai | 280/644 |
| 5,467,839 A | 11/1995 | Yoshio | |
| 5,741,021 A * | 4/1998 | Saint et al. | 280/47.38 |
| 5,816,648 A | 10/1998 | Baccili et al. | |
| 5,988,669 A | 11/1999 | Freese et al. | |
| 6,273,451 B1 * | 8/2001 | Julien et al. | 280/642 |
| 6,464,244 B1 * | 10/2002 | Cheng | 280/650 |
| 6,467,839 B1 * | 10/2002 | Kain | 297/188.14 |
| 6,478,327 B1 * | 11/2002 | Hartenstine et al. | 280/642 |
| 7,044,497 B2 * | 5/2006 | Hartenstine et al. | 280/642 |
| 7,073,815 B2 * | 7/2006 | Espenshade et al. | 280/642 |
| 7,118,121 B2 * | 10/2006 | Cheng et al. | 280/642 |
| 2003/0116943 A1 * | 6/2003 | Yamazaki | 280/642 |

* cited by examiner

*Primary Examiner*—Christopher Ellis
*Assistant Examiner*—Cynthia F Collado
(74) *Attorney, Agent, or Firm*—Martin Fruitman

(57) ABSTRACT

The apparatus is a child's stroller that maintains all the wheels on the ground while it is being folded. The rear legs are interconnected with but separated from the armrests and move on circular paths, the centers of which are pivot points on the armrests. Therefore, the tops of the rear legs move around to a height different from the position of the front leg pivot point, and the location of the tops of the rear legs are determined by the position of the attached wheels rather by the pivot point of the front legs. Another linkage lowers the canopy support frame as the stroller is being folded in order to reduce the stroller's overall folded length.

4 Claims, 6 Drawing Sheets

STANDING FOLDABLE STROLLER

BACKGROUND OF THE INVENTION

This invention deals generally with children's strollers and more specifically with a stroller that folds compactly and is very stable when folded and standing upright.

Currently many strollers stand when they are in a folded position, but many are unstable or awkward to fold. Some require the user to fold the stroller to the ground and then bend over and pick it up to place it in a vertical orientation to make it stand. This is inconvenient due to the fact that the user must bend over and pick up the weight of the stroller. Still others require the stroller to stand on the rear wheels and some other frame component, usually the basket tube, and during the folding process the stroller must be controlled with two hands in order to keep it balanced over the rear wheels. In many cases the footprint of the standing stroller is so small that it makes the stroller somewhat unstable and easy to knock over.

It is always desirable to have the stroller fold to the smallest folded size possible so that it does not take up extra space when stored and to make it more convenient to put in and take out of vehicles. Typically, the handle and the canopy frame are the areas that contribute most to the overall folded size in the longest dimension. In such configurations the handle controls the overall folded size, but the canopy frame is the second largest component. It is common to have the stroller handle adjustable in height to accommodate users of different heights. It is also common for there to be a folding mechanism that allows the handle and the upper part of handle tube to rotate in a range of approximately 180 degrees so that the handle can be placed in a storage position thereby reducing the overall size of the folded stroller. This typically leaves the canopy frame as the highest point of the folded stroller which leaves it vulnerable to damage, and is the major factor in the overall folded size.

Many strollers also have a storage area above the canopy and below the handle for use by the person pushing the stroller. Typically, this storage area is a molded rigid tray that includes a cup holder and storage compartments with or without lids. The problem with such storage areas is that they are a pre-designed and unchangeable structure. Nothing is available to serve as simple a purpose as moving the cup holder to a location convenient for a left handed person.

It would be very beneficial to have a stroller that not only keeps the front and rear wheels on the ground while being folded, but is also very stable when standing, has a shorter folded height than is presently available, and includes a storage area just below the handle that can be rearranged for the user's convenience.

SUMMARY OF THE INVENTION

A preferable folding technique is to have the stroller fold while both the front and rear wheels remain in contact with the ground. During the folding process, the front wheels and the rear wheels roll toward each other until the stroller is completely folded. The stroller is then in a standing position supported by both the front and rear wheels. The benefits to this method of folding are that the user does not have to control the balance of the stroller during the process of folding the unit and does not have to bend over to pick up the folded stroller. It can also be quite stable when standing in the final folded position if the wheels come together with a footprint that is large and the center of gravity of the stroller is directly over the wheels.

The present invention is such a stroller, with a frame geometry that allows the stroller to fold while all the wheels remain in contact with the ground, stand stably folded with front and rear wheels on the ground with the center of gravity between the front and rear wheels, and automatically lower the canopy as the stroller folds so that the total height is conveniently low. These benefits are accomplished by the use of several additional links and brackets that provide unconventional pivot actions and motions for the legs, seat, and handle tubes as the stroller is being folded.

Two such brackets are the rear leg pivot extensions. While the tops of the front legs are attached directly to pivot points on the armrests, the tops of the rear legs are attached to pivot points by means of the rear leg pivot extensions that are oriented at an angle to the rear legs. Thus, as the front of the armrests move upward during folding, rather than pivoting directly on the front leg pivot points, the rear legs are separated from the armrests and move on circular paths, the centers of which are pivot points on the armrests. Therefore, the tops of the rear legs move around to a height different from the position of the front leg pivot point, and the location of the tops of the rear legs can be determined by the position of the attached wheels rather by the pivot point of the front legs.

Another action during folding is the automatic lowering of the canopy support frame which is performed by the fold links which are located between the rear legs and the rears of the armrests when the stroller is open. The fold links are attached at pivot points on the rear legs and to pivot points on the handle tubes, and the lower ends of the canopy support frame that holds the front of the canopy are attached by pivots at the tops of the fold links. Therefore, when the folding is taking place, and the handle tubes are moving down relative to the front legs, the top ends of the fold links swing down and bring the canopy support frame down with them. Ultimately, the top of the canopy support frame is pulled down to a point level with the folding mechanism at which the tops of the handle tubes are rotated down, so that the top of the canopy does not protrude beyond the folded handle.

Another feature of the present invention is the simple support structure that serves as a holder for many accessories for the adult user of the stroller and also for anchoring the rear of the canopy. This device is an accessory support bar constructed with an inverted "U" cross section that is installed parallel to and below 3 the stroller handle between the folding mechanisms of the handle tubes. The front edge of the "U" has a curved lip forming a channel opening upward which holds the rod supporting the rear edge of the canopy. The rear edge of the "U" is left with a simple edge aimed down. The accessory support bar then accommodates accessories such as cup holders, trays, and covered containers. Such accessories attach individually to the bar by the use of an extension on the accessory that fits over the top of the inverted "U", and an engagement fixture that fits over the bottom of the rear edge of the "U". Since each of the accessories is individually hung on the accessory support bar, the user can select and arrange them for the user's own convenience.

The present invention thereby furnishes a stroller that is easy to fold, stands upright during and after folding, has a small size when folded, and includes a versatile, easily customized, accessory storage system.

DETAILED DESCRIPTION OF THE INVENTION

Figure 1:
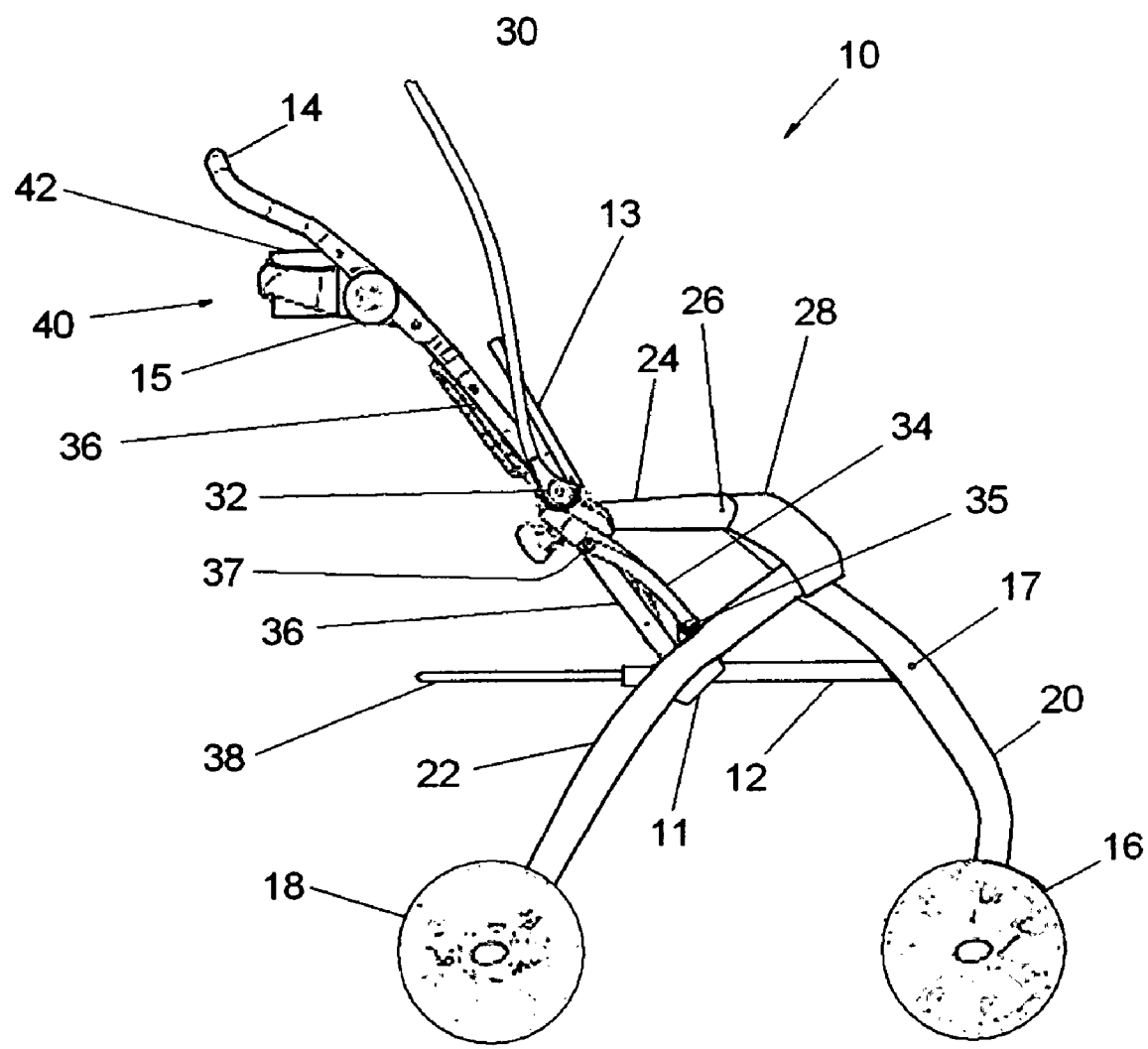
FIG. 1 is a side view of the stroller of the preferred embodiment of the invention in the fully open condition.
Figure 2:
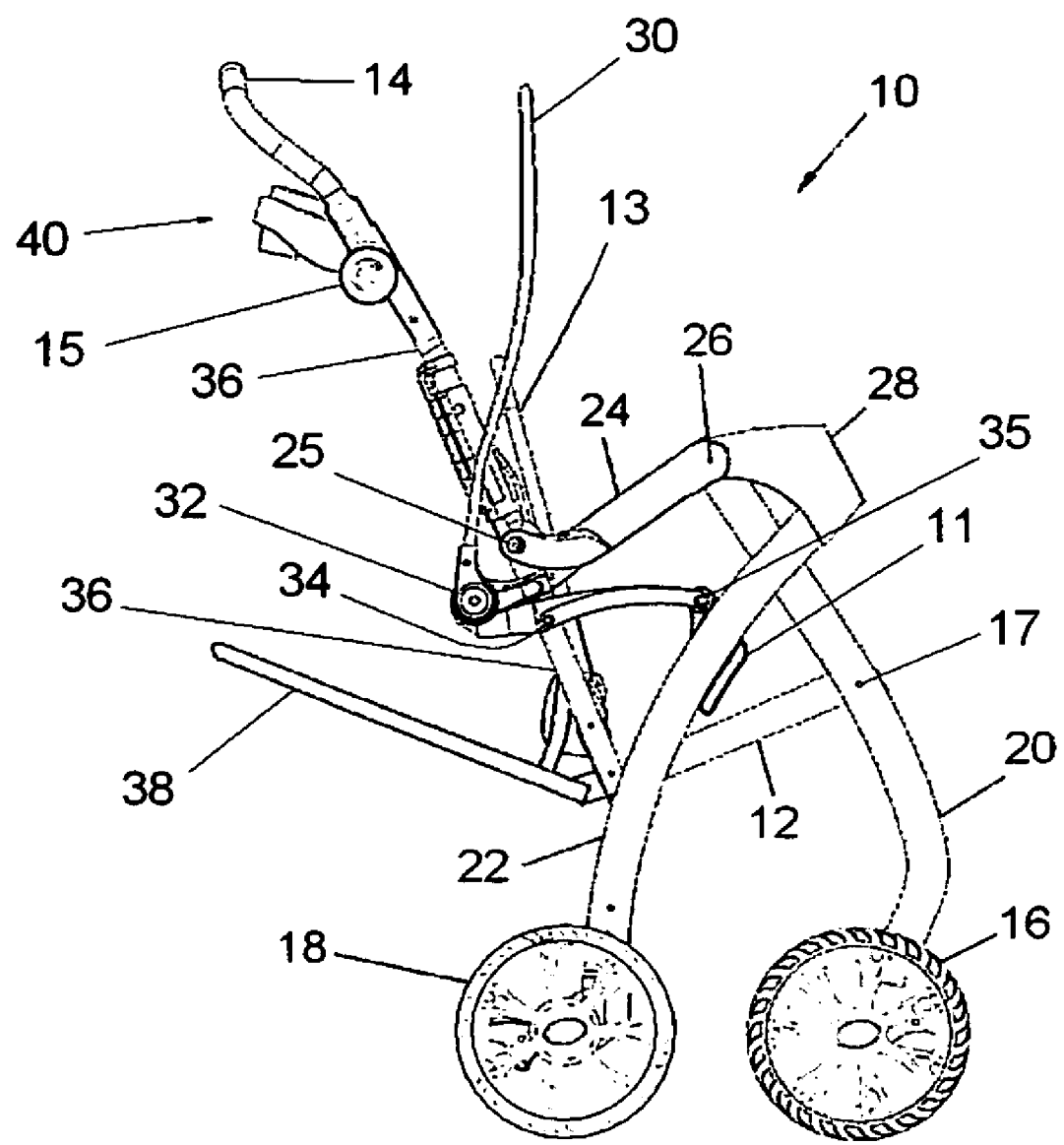
FIG. 2 is a side view of the stroller of the preferred embodiment of the invention in the partially folded condition.
Figure 3:
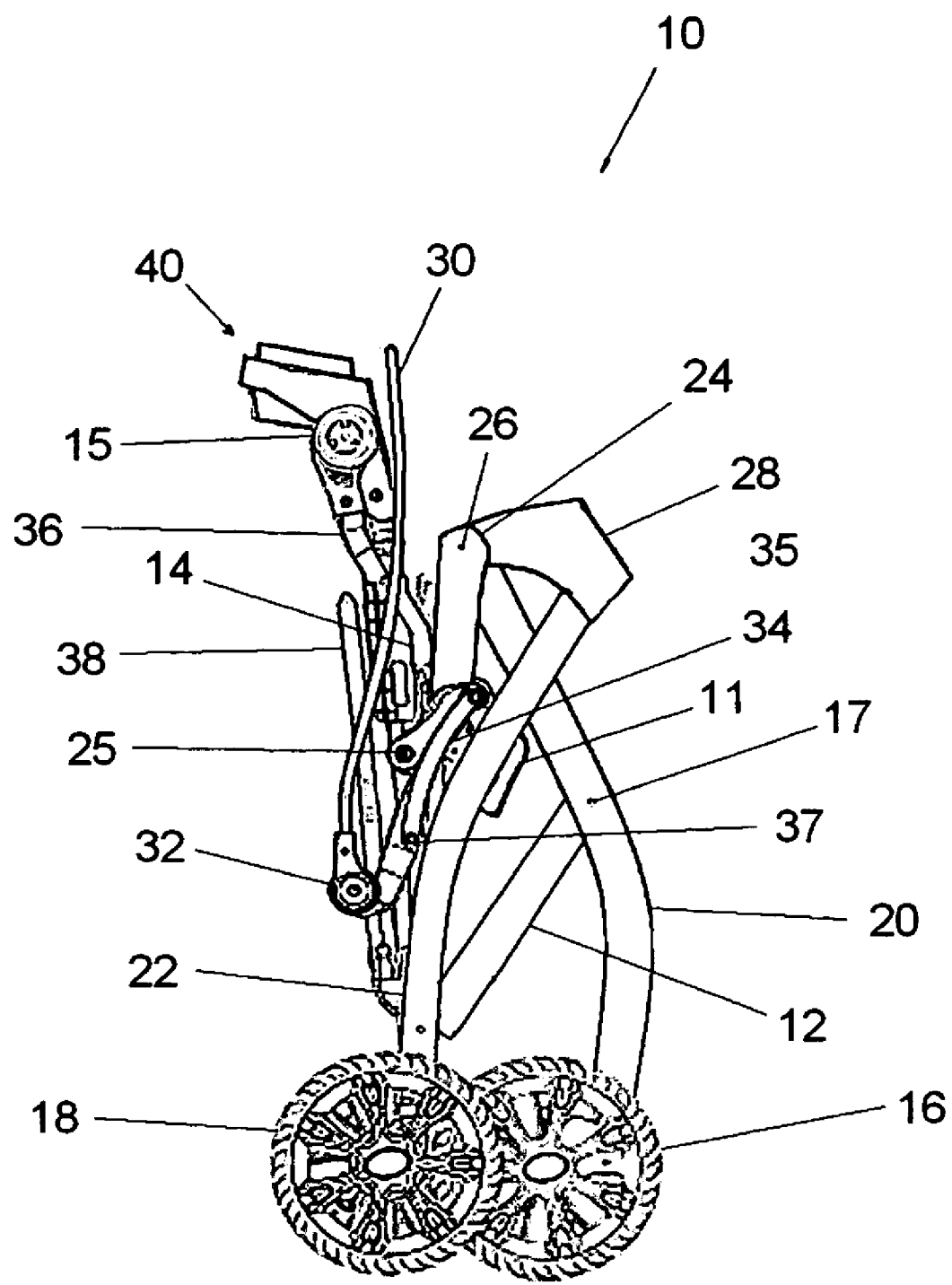
FIG. 3 is a side view of the stroller of the preferred embodiment of the invention in the fully folded condition.

FIG. 1 is a side view of stroller 10 of the preferred embodiment of the invention in the fully open condition. Since FIGS. 1, 2, and 3 are side views of the same stroller in open, partially folded, and fully folded conditions, respectively, all the part identifying numbers for these views are the same. Furthermore, since these figures are straight on side views, the only parts visible in these views are those on the right side of a child seated in the stroller. As can be appreciated by anyone who has seen a stroller, there are duplicates of these parts on the other side of the stroller that are not visible in these views because they are behind the parts shown, and seat 12 and seat back 13 are attached between the two sides. It should also be appreciated that strollers are also sometimes constructed with only a single front wheel, usually as a jogging stroller. However, the present invention can also serve such strollers.

As is conventional terminology with such devices, the direction toward which the child is facing is considered the front of the stroller, and handle 14, where the adult user pushes the stroller, is considered the rear. Thus, front wheels 16 and rear wheels 18 are the front-rear indicators for the other parts on stroller 10.

Stroller 10 is particularly designed and constructed so that, even as it is being folded, both front wheels 16 and rear wheels 18 remain on the ground and stroller 10 remains stable in the upright position, as shown in FIGS. 1, 2, and 3. This benefit is attained by the structures of and relationships between front legs 20 and rear legs 22. Front legs 20 and rear legs 22 are both attached to the fronts of armrests 24 at pivot points 26, but the structure of their attachments is substantially different. Front legs 20 are conventionally attached and form continuous smooth curves between pivot points 26 and front wheels 16. However, rear legs 22 are attached to pivot points 26 by means of rear leg pivot extensions 28, which are rigidly attached to or integrated with the tops of rear legs 18 at a substantial angle and separate the rear legs from their pivot points. Rather than pivoting directly upon pivot points 26, rear legs 22 thereby move around pivot points 26 on circular paths, the centers of which are pivot points 26. Although in the preferred embodiment shown in FIGS. 1-3 rear leg pivot extensions 28 are attached to front leg pivot points 26 this is not a requirement of the geometry, and rear leg pivot extensions 28 can be attached to their own pivot points.

Several other parts of stroller 10 that can be seen clearly in FIG. 1 and are pertinent to the folding action are latches 11, handle fold mechanisms 15, canopy support frame 30, canopy pivot fixture 32, fold links 34, handle tubes 36, under seat basket hangers 38, and accessory assembly 40. Most of these parts move during the folding action and the particular motion of each part can best be appreciated by following the differences in their positions from FIG. 1 to FIG. 2 and finally to FIG. 3.

The most obvious action that occurs during folding shown in FIGS. 1-3 is the movement of front wheels 16 and rear wheels 18 toward each other. This motion is permitted by releasing latches 11, and lowering handle tubes 36 and the rears of seat 12 and armrests 24 that are attached to handle tubes 36 at pivots 25. Because of the pivoting of rear leg pivot extensions 28 that are attached to rear legs 22, the tops of rear legs 22 move upward relative to the tops of front legs 20 as rear wheels 18 and front wheels 16 move together. The angled orientation of rear leg pivot extensions 28 and the separation of rear legs 22 from the pivot points causes rear legs 22 to move on circular paths around and spaced from pivots 26 rather than directly on pivots 26, and the lengths of rear leg pivot extensions 28 are selected to compensate for the increased height of rear legs 22 as they approach front legs 20 and a vertical orientation. Therefore, all the wheels can remain at the same level during the folding process. In a conventional stroller, when the rear legs attached to the front legs, the rear wheels usually extend below the front wheels as the legs move together.

Another basic action during folding is the folding of seat 12 and seat back 13. Once latches 11 are released, seat 12 pivots down around front pivots 17 as handle tubes 36, which are pivotally attached to the rear of seat 12, are lowered. Seat back 13, which is also pivotally attached to the rear of seat 12, then also moves down and folds toward seat 12.

As can be seen in FIGS. 1 and 2, normally the highest parts of a stroller are the tops of handle 14 and canopy support frame 30. For compact folding, some stroller designs have rotated handle 14 and the upper portion of handle tubes 36 around handle fold mechanisms 15 and down to a position adjacent to the lower portions of handle tubes 36. However, this not only leaves canopy support frame 30 protruding up at the top of the folded stroller and determining its overall length, but since canopy support frame 30 is not a strong structural member, it is subject to damage. The present invention solves this problem by automatically lowering canopy support frame 30 as the stroller is folded.

As with most strollers, canopy support frame 30 is attached to the stroller frame at canopy pivot fixtures 32. This permits canopy support frame 30 to be rotated forward to use the canopy to shield the child in the stroller and also to be rotated toward the rear to permit access to the child or simply to put the child into the stroller. In stroller 10 of the present invention canopy pivot fixtures 32 and the bottom ends of canopy support frame 30 are attached to fold links 34. Fold links 34 are attached to pivot points 37 on handle tubes 36 and to rear legs 22 at pivot points 35 that are approximately one-third of the length of the rear legs down from the tops of rear legs 22. When stroller 10 is open the tops of fold links 34 are located just to the rear of armrests 24.

Thus, when stroller 10 is being folded and handle tubes 36 are moving down relative to front legs 20, the top ends of fold links 34 are swinging down and bringing canopy support frame 30 down with them. As shown in FIG. 3, the top of folded back canopy support frame 30 is thereby pulled down to a point approximately level with the highest points on handle tubes 36 after the handle tubes themselves have been folded down.

Figure 4:
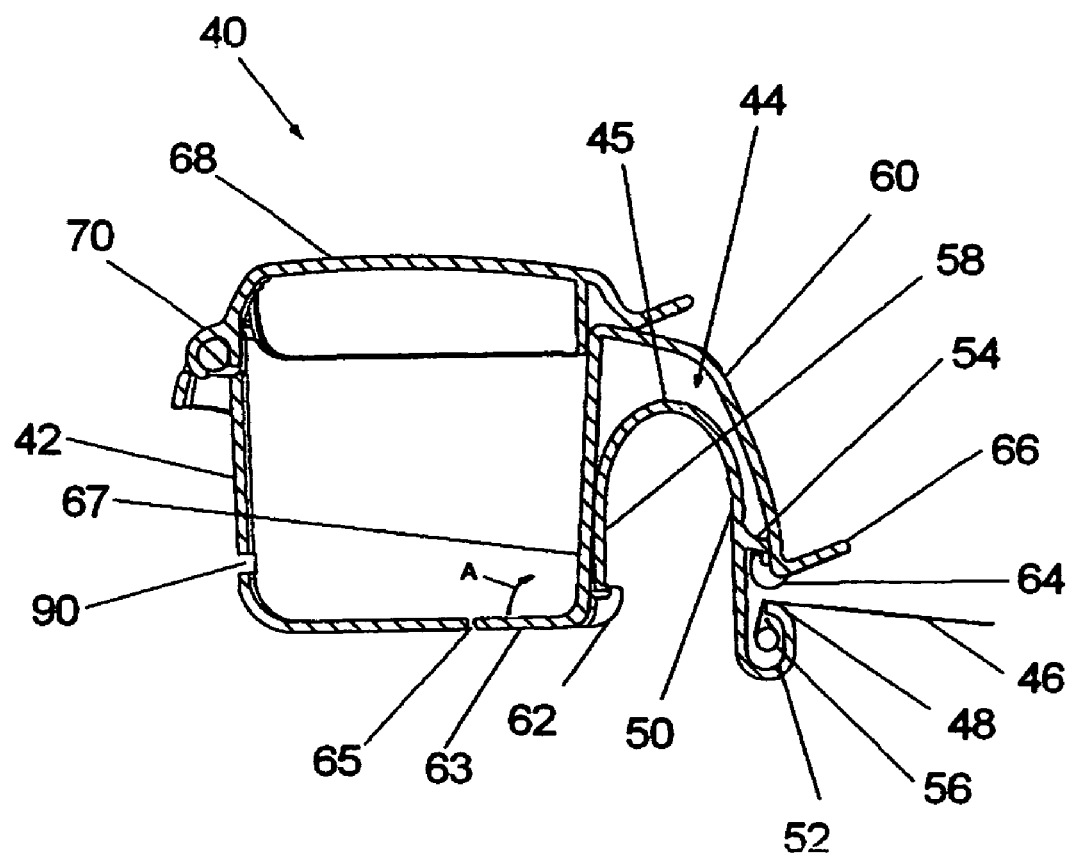
FIG. 4 is a cross section side view of the adult user accessory assembly of the preferred embodiment of the invention shown with an attached container.

FIG. 4 is a cross section side view of accessory assembly 40 of the preferred embodiment of the invention shown with attached container 42. Accessory assembly 40 is a simple support bar 44 that can serve both as a holder for a variety of accessories for the adult user of the stroller and also for anchoring the rear of canopy 46. Support bar 44 is constructed as an inverted channel with web 45 joining first wall 50 to second wall 58. In the preferred embodiment, support bar 44 is constructed with a "U" cross section with first edge 48 of first wall 50 curved to form channel 52 opening upward. First wall 50 of support bar 44 also includes ledge 54 formed on the outside surface.

To serve as the accessory assembly for an adult user, support bar 44 is installed parallel to and below handle 14 between the two handle fold mechanisms 15 on handle tubes 36, with first wall 50 on the side toward the front of the stroller. This location can be seen in FIG. 1, although support bar 44 is itself hidden and only accessory 42 can be seen. In this location channel 52 can hold rod 56 around which is wrapped the rear edge of canopy 46, thus supporting the rear of canopy 46 without complex additional structures.

Second wall 58 of support bar 44 has only a simple edge pointing down. Support bar 44 then accommodates accessories such as covered container 42, cup holders, or trays. Such accessories attach individually to the bar by the use of handle-like extension 60 which typically has some ability to flex as it fits over web 45 of support bar 44. Engagement fixture 62 fits around the bottom edge of second wall 58 and thus locks onto support bar 44.

Engagement fixture 62 is mounted on flexible section 63 of accessory 42 to facilitate release of engagement fixture 62 from wall 58. Flexible section 63 is formed quite simply by cutting slot 65 all the way around it except at location 67 on the wall of accessory 42. The connection at location 67 operates as a stiff spring hinge to support flexible section 63 and engagement fixture 62 and to permit slight movement of flexible section 63 in the direction indicated by arrow A to release engagement fixture 62 from wall 58.

Extension 60 of accessory 42 also includes latch 64 that fits under ledge 54 to lock accessory 42 onto support bar 44. Accessory 42 can then easily be released from support bar 44 by flexing extension 60 by moving tab 66 and latch 64 away from ledge 54.

It should be appreciated that although accessory 42 is shown with cover 68 attached by hinge 70, virtually any accessory can be built with the same features and attached to support bar 44 in the same manner. Furthermore, support bar 44 can be used elsewhere on stroller 10, including being designed into the geometry of armrests 24.

Figure 5:
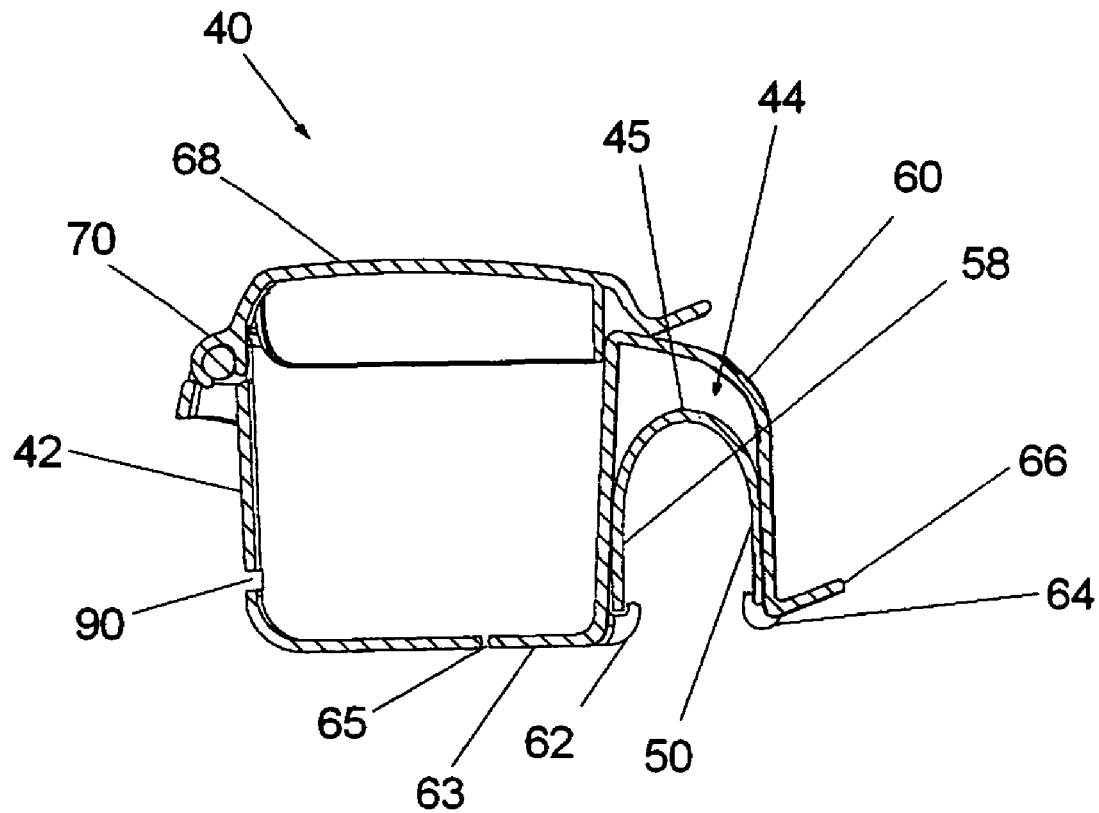
FIG. 5 is a cross section side view of an alternate embodiment of an accessory assembly with an attached container.

FIG. 5 is a cross section side view of an alternate embodiment of an accessory assembly with an attached container, and the embodiment of FIG. 5 is typical of the structure that can be used in the armrests of a stroller. FIG. 5 differs from FIG. 4 only in that FIG. 5 does not include channel 52 that supports the rear of canopy 46. In FIG. 5 first wall 50 of extension 60 merely terminates in the same way as second wall 58 and latch 64 engages the lower edge of first wall 50. The flexibility of extension 60 of accessory 42 permits accessory 42 to be used in both of the situations of FIG. 4 or FIG. 5, and flexible section 63 of accessory 42 makes it easy to remove the accessory from either of the accessory assemblies shown in FIG. 4 and FIG. 5. Furthermore, since each accessory used is individually hung on support bar 44, the user can select and arrange them for the user's own convenience.

Figure 6:
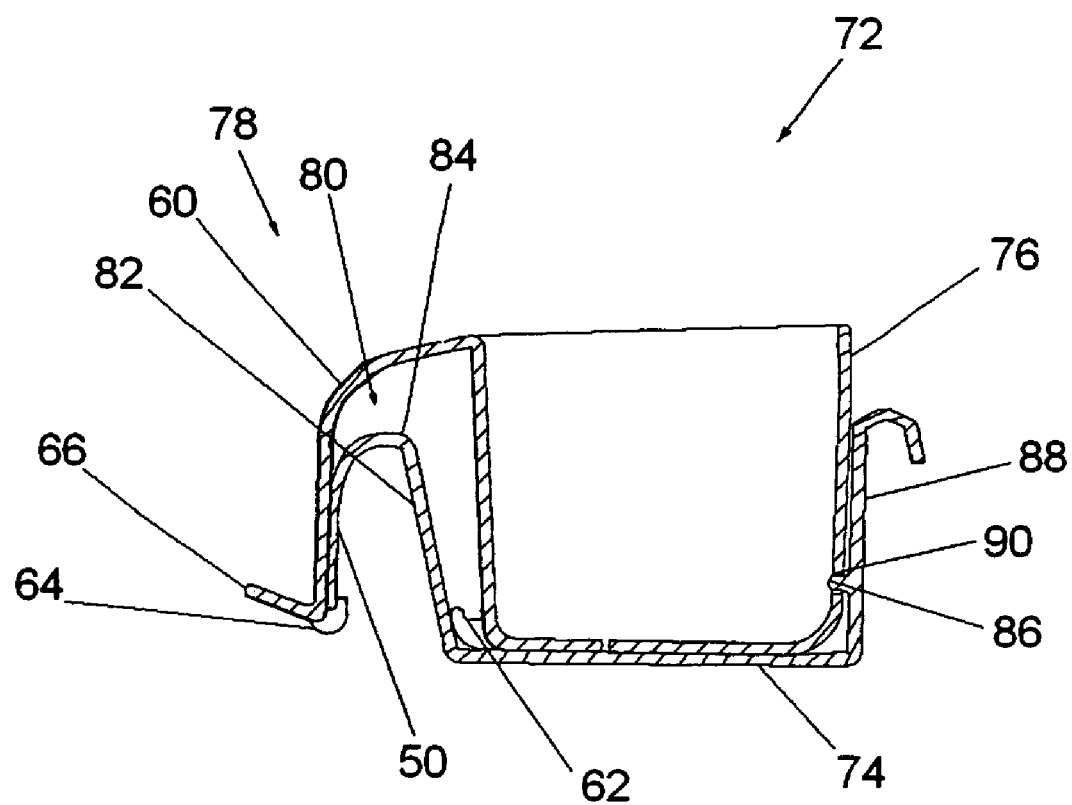
FIG. 6 is a cross section side view of an alternate embodiment of an accessory assembly which is a child's tray shown with an attached accessory.

FIG. 6 is a cross section side view of an alternate embodiment of the invention that shows accessory assembly 72, which is child's tray 74, that is shown with attached accessory 76. Accessory 76 is virtually the same as container 42 of FIGS. 4 and 5 except that accessory 76 has no cover, and since a child's tray is located on the front of the stroller, the front to back orientation of accessory 76 is reversed from the orientation of accessory 42 shown in FIGS. 4 and 5.

Accessory assembly 72 differs from accessory assembly 40 previously described in that accessory assembly 72 locks accessory 76 inside tray 74 rather than hanging the accessory on the outside surfaces. Nevertheless, exterior latching system 78 for accessory assembly 72 is the same as one of the latching systems of accessory assembly 40 of FIG. 4, and identical parts are identified by the same numbers. The only true difference is in the shape of inverted channel 80, which is actually a part of tray 74. In FIG. 6 channel 80 has a slanted second wall 82 which results in a shorter web 84. Even these differences occur only because they are based upon the design of a typical child's tray 74, and they are not critical to the design of the invention. The only true requirement is that the exterior dimension of the accessory, including engagement fixture 62, fit snugly within the interior front to back dimension of child's tray 74. The coordination of dimensions is one feature that permits the same accessories to be used with both child's tray 74 and accessory assembly 40 (FIG. 4).

While extension 80 of accessory 76 grips wall 50 of inverted channel 80, the other side of accessory 76 is locked into tray 74 by interlocking fixture 86 on wall 88. Hole 90 in accessory 76 engages interlocking fixture 86 to hold accessory 76 into tray 74. Hole 90 can be seen more clearly in FIGS. 4 and 5 in which there is no fixture with which it mates. Hole 90 is the other feature of the accessories that permits them to be used with all the accessory assemblies shown in FIGS. 4, 5, and 6.

The present invention thereby furnishes a stroller with several benefits. First, the stroller maintains itself upright and stable while it is being folded. It also automatically lowers its canopy support frame during the folding action, thereby significantly reducing the height of the folded stroller, and it provides a simple and versatile accessory holding system that permits the accessories to be rearranged at any time.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example the particular angle and size of rear leg pivot extensions 28 can varied to accommodate the length and spacing between the front and rear legs. Moreover, the folding mechanism can also be used on strollers with as few as three wheels, and the size and the location of the pivot points of fold links 34 will vary with the length of canopy support frame 30. Furthermore, accessory assemblies 40 and 72 can be used on other devices, such as high chairs or play yards, and various other attachment fixtures and release fixtures, such as hole and pin configurations, can be used on the accessories.

What is claimed as new and for which Letters Patent of the United States are desired to be secured is:

1. A foldable stroller comprising:
at least three legs, with the legs arranged with front legs and rear legs, and with a front wheel interconnected with each front leg and a rear wheel interconnected with each rear leg, with each leg extending upward from the wheel interconnected with it;
a seat for supporting a child, the seat having a front, a rear, and two sides, with the seat located between the rear legs and attached to the front legs at seat pivot points;
two armrests located, one above each side of the seat, with each front leg attached to an armrest at a front leg pivot point; and
a rear leg pivot extension attached to each rear leg and to an armrest at a rear leg pivot point and separating the rear leg from the rear leg pivot point, with the rear leg pivot extension oriented at an angle to the rear leg to move the rear leg in a circular path, the center of which is the rear leg pivot point as the rear wheels and the front wheels move toward each other.

2. The foldable stroller of claim 1 wherein the front leg pivot points and the rear leg pivot points are the same pivot points.

3. A foldable stroller comprising:
at least three legs, with the legs arranged with front legs and rear legs, and with a front wheel interconnected with each front leg and a rear wheel interconnected with each rear leg, with each leg extending upward from the wheel interconnected with it;
a seat for supporting a child, the seat having a front, a rear, and two sides, with the seat located between the rear legs and attached to the front legs at seat pivot points;
a handle with two handle tubes with each handle tube attached to the handle and to each side of the seat;
an independent canopy support frame with lower ends that are located on each side of the seat; and
a fold link located on each side of the seat, with each fold link pivotally attached to a rear leg and pivotally attached to a handle tube, and with each canopy support frame lower end interconnected with a fold link on the same side of the seat, so that as the stroller is folded, the fold link and the canopy support frame are lowered.

4. The foldable stroller of claim 3 further including a canopy pivot fixture interconnecting each lower end of the canopy support frame to the fold link.

* * * * *